(12) United States Patent
Hougo et al.

(10) Patent No.: US 8,116,966 B2
(45) Date of Patent: Feb. 14, 2012

(54) LOW POWER MICROWAVE VEHICLE STOPPER WITH FEEDBACK

(75) Inventors: Vincent C. Hougo, Santa Barbara, CA (US); Jack E. White, Santa Barbara, CA (US)

(73) Assignee: Raytheon Company, Waltham, MA (US)

( * ) Notice: Subject to any disclaimer, the term of this patent is extended or adjusted under 35 U.S.C. 154(b) by 210 days.

(21) Appl. No.: 12/581,087

(22) Filed: Oct. 16, 2009

(65) Prior Publication Data

US 2011/0093180 A1    Apr. 21, 2011

(51) Int. Cl.
    *F02D 41/26* (2006.01)
(52) U.S. Cl. ............... 701/112; 701/107; 123/198 D
(58) Field of Classification Search ............... 701/112; 123/198 DB, 198 DC; 180/167; 340/902, 340/904; 307/10.1, 10.2, 10.3, 10.4, 10.5, 307/10.6
    See application file for complete search history.

(56) References Cited

U.S. PATENT DOCUMENTS

| | | | |
|---|---|---|---|
| 5,293,527 A | | 3/1994 | Sutton et al. |
| 5,907,290 A | | 5/1999 | Turner et al. |
| 5,937,823 A | * | 8/1999 | Reeder et al. ............... 123/335 |
| 6,897,762 B2 | * | 5/2005 | Howells ............... 340/5.31 |
| 2005/0263120 A1 | * | 12/2005 | Fifelski et al. ............ 123/179.2 |
| 2008/0223641 A1 | | 9/2008 | Elson |
| 2009/0085731 A1 | | 4/2009 | Boggess |
| 2011/0133912 A1 | * | 6/2011 | Tesman ............ 340/426.12 |

FOREIGN PATENT DOCUMENTS

| | | |
|---|---|---|
| FR | 2 793 973 A1 | 1/2000 |
| WO | WO 99/43513 | 9/1999 |

OTHER PUBLICATIONS

Written Opinion of the International Searching Authority for International Application No. PCT/US2010/051520, filed Oct. 5, 2010. Written Opinion dated Feb. 3, 2011 and mailed Feb. 10, 2011 (6 pgs.).
International Search Report for International Application No. PCT/US2010/051520, filed Oct. 5, 2010, International Search Report dated Feb. 3, 2011 and mailed Feb. 10, 2011 (4 pgs.).

* cited by examiner

*Primary Examiner* — Hai Huynh
(74) *Attorney, Agent, or Firm* — Christie, Parker & Hale, LLP

(57) ABSTRACT

A low power remote vehicle stopper with feedback that can disable a moving vehicle with low power microwave interruption signal. According to an embodiment of the present invention, a system for disrupting an internal combustion engine is provided. The system includes a receiver for wirelessly receiving an emitted signal from the internal combustion engine, the emitted signal corresponding to an operational parameter of the internal combustion engine, a signal generator for generating an interruption signal in accordance with the emitted signal, and a transmitter for transmitting the interruption signal to disrupt an operation of the internal combustion engine.

11 Claims, 5 Drawing Sheets

LOW POWER MICROWAVE VEHICLE STOPPER WITH FEEDBACK

BACKGROUND OF THE INVENTION

1. Field of the Invention

The present invention relates to the field of remote vehicle disabling, and, more particularly, to remote vehicle disabling with microwave energy.

2. Description of the Related Art

Law enforcement personnel around the world face a common problem in the field today. The circumstance where a driver refuses to comply with the request to stop is the most applicable event. Available techniques such as road blocks, barricades, or tack strips are generally used but these approaches are generally dangerous to employ in the field. Deploying obstacles such as barricades, patrol cars, nets, tack strips on a public road can be dangerous to everyone. In addition, these techniques are not always effective because the vehicle has the ability to force through or "run" the roadblock by speeding through the barricades. Furthermore, roadblocks typically require the services of several law enforcement officers, and in the event the vehicle forces through the barricades successfully, it is often required that the officers engage in high-speed pursuit which is dangerous to the public and the officers. Therefore, a safer way of disabling a moving motor vehicle is useful and desired by law enforcements. In addition, Drug Enforcement Agency, Department of Homeland Security and Military Counter Terrorism may use similar non-lethal approaches.

Besides the use of obstructive techniques mentioned above, moving motor vehicles can be disabled by electromagnetic pulse (EMP) or high power microwaves that disrupts the electronic components of the vehicles. However, the use of EMP to disable a moving vehicle requires very high energy levels that are difficult to deploy in the field. Similarly, the use of high power microwaves requires a very high power microwave source that is also very difficult to deploy and package. Furthermore, EMP and high power microwaves are unsafe for people in the area of application.

When high power microwaves or EMP is used to stop a moving vehicle, microwave radiation is directed toward the vehicle to disable or inhibit electronic components of the vehicle. This includes the electronic control modules for controlling electronic fuel injectors, or the distributors, however, it is difficult to direct the microwave energy directly against a single vehicle. Thus, when the microwave radiation is not adapted to disable a particular vehicle's electronic components, all or many of the vehicles in the vicinity of the targeted vehicle may also be temporarily or permanently disabled. The disabling of the non-targeted vehicles may become a hazard to the law enforcement personnel and the public.

SUMMARY OF THE INVENTION

In accordance with exemplary embodiments of the present invention, a remote vehicle stopper (hereinafter "vehicle stopper") with feedback that can disable a moving vehicle with low power radio frequency (RF) energy is provided.

According to the exemplary embodiments, a VHF technique where the RF energy is radiated at a specific frequency with a unique technique which would be directed toward a specific vehicle type. The net result is a practical, easily deployable and non-lethal way of stopping a moving target vehicle without affecting other vehicles and people in the vicinity.

According to an embodiment of the present invention, a system for disrupting an internal combustion engine is provided. The system includes: a receiver for wirelessly receiving an emitted signal from the internal combustion engine, the emitted signal corresponding to an operational parameter of the internal combustion engine; a signal generator for generating an interruption signal in accordance with the emitted signal; and a transmitter for transmitting the interruption signal to disrupt an operation of the internal combustion engine.

According to an embodiment, the signal generator may include a database for storing engine information of a plurality of different engine types and/or fuel systems.

According to an embodiment, the signal generator may include a techniques generator for generating various RF techniques to disrupt the operation of the internal combustion engine.

According to an embodiment, the signal generator may include a signal processor.

According to an embodiment, the interruption signal may be modulated in accordance with the emitted signal.

According to an embodiment, the emitted signal may correspond to the engine timing of the internal combustion engine.

According to an embodiment, the receiver, the transmitter and the signal generator may form a closed-loop feedback system.

According to an embodiment, the receiver may provide feedback to the signal generator on the effectiveness of the interruption signal in disrupting the operation of the internal combustion engine.

According to an embodiment, the signal generator may adjust the interruption signal in accordance with the feedback to improve the effectiveness of the interruption signal on disrupting the operation of the internal combustion engine.

According to an embodiment, the interruption signal may include a complex modulation.

According to an embodiment, the complex modulation may include square wave and pulse modulation types.

BRIEF DESCRIPTION OF THE DRAWINGS

The accompanying drawings illustrate embodiments of the present invention, and together with the description, serve to explain the principles of the embodiments of the present invention.

DETAILED DESCRIPTION

Embodiments of the present invention are directed toward a vehicle stopper (hereinafter "vehicle stopper") that can disable a moving target vehicle with low power microwave interruption signal with feedback. The illustrative embodiments that follow are only exemplary applications of the present invention and not intended to limit the scope of the invention.

To stop a moving vehicle, the vehicle stopper remotely injects a synchronized radio frequency signal that interferes with the engine's electronic components such as ignition timing circuits of the target vehicle in order to stop the target vehicle by disrupting the ignition operation of the engine. To generate the synchronized radio frequency signal, the vehicle stopper listens with an antenna to signals (e.g., RF signals) emitted from the vehicle to detect the particular engine timing (e.g., ignition timing) of the vehicle or other characteristics of the engine. Once the engine timing is detected, an RF source included in the vehicle stopper is synchronized with the detected engine timing such that suitable modulation is applied in sequence with engine RPM timing.

Accordingly, by using a signal receiver (hereinafter "receiver") and a synchronized signal jammer (e.g., an RF signal transmitter), a target vehicle can be selected, synchronized with, and jammed without harming the device operator, vehicle occupants, or innocent bystanders and other vehicles in the vicinity. RF noise that leaks or radiates from the engine of the target vehicle can be used to identify its engine timing and other engine characteristics.

Figure 1A:
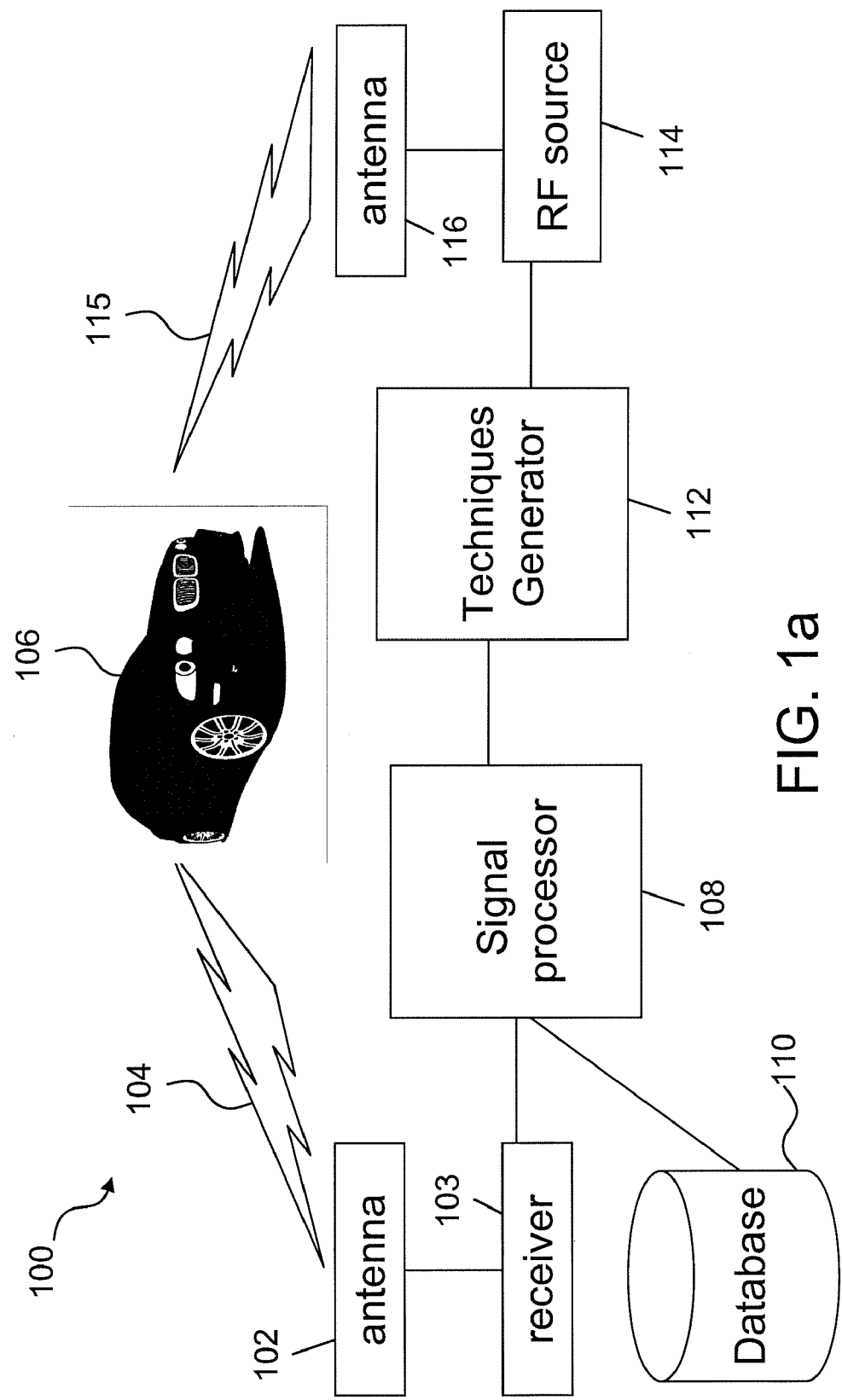
FIG. 1a is a conceptual block diagram illustrating a vehicle stopper according to an embodiment of the present invention.

FIG. 1a is a conceptual block diagram illustrating a system of a vehicle stopper according to an embodiment of the present invention.

According to the embodiment of the present invention, low power RF or microwave signal can disrupt and/or reset a target vehicle's engine control unit and related electronics when the modulated low power RF jamming signal is synchronized with the engine timing. Selectivity of a single target among several vehicles and options to destroy electronics or preserve operation after jamming signal is removed can be achieved with this synchronized closed-loop feedback approach to provide non-lethal vehicle stopping capability.

Referring to FIG. 1a, the vehicle stopper 100 includes a receive antenna 102 and a receiver 103 (e.g., RF receiver) for listening to RF signals 104 emanating from a target vehicle 106. A processor 108 (e.g., a general purpose processor or a signal processor) connected to the receiver 103 processes the RF signals and identifies the RF signature (e.g., ignition timing) of the target vehicle 106 or other measures of engine timing. The processor 108 automatically uses a database 110 of engine information to select the best interference signal suitable for disrupting the target vehicle's engine type or fuel system in accordance with the identified RF signature. The processor 108 together with a techniques generator 112 control a suitable RF source 114 (e.g., a programmable RF transmitter) to generate a synchronized radio frequency signal 115 that is synchronized to the target vehicle's engine timing. The techniques generator 112 together with the processor 108 generate various RF techniques (e.g., various lower power modulation techniques) to interfere with the target vehicle's engine or fuel system operations. Here, the synchronized radio frequency signal 115 is transmitted to the target vehicle using a transmit antenna 116. In some embodiments, the receive antenna 102 and the transmit antenna 116 may be the same antenna. While the synchronized radio frequency signal 115 is being transmitted, the vehicle stopper 100 listens to the RF signals 104 emanating from the target vehicle 106 to determine the effectiveness of the first applied interference signal on the target vehicle 106. As such, a closed-feedback loop is formed, wherein the emanating RF signals 104 can be monitored and the synchronized radio frequency signal 115 adjusted to improve its effectiveness on the target vehicle 106.

Figure 1B:
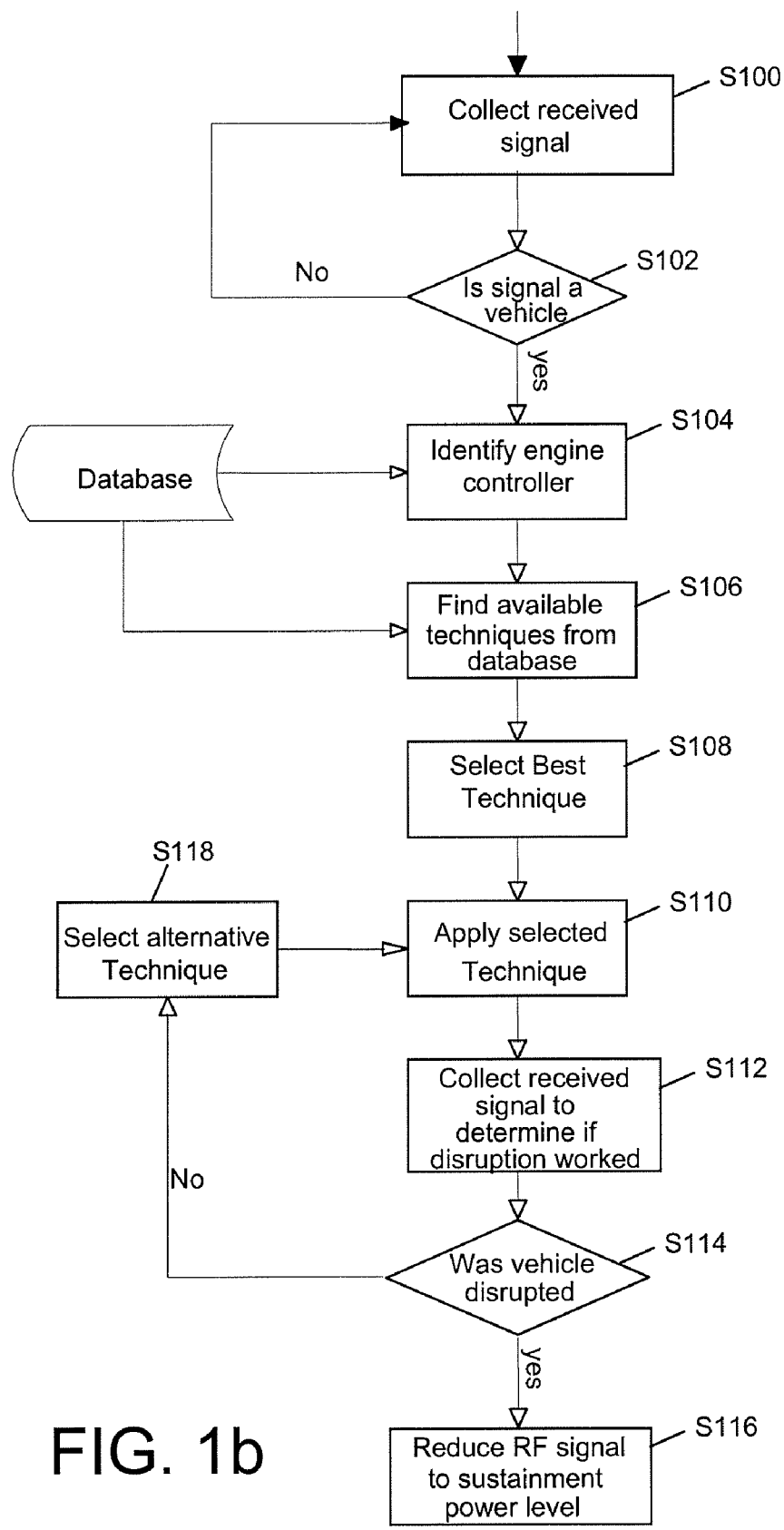
FIG. 1b is a flowchart illustrating a decision tree of the vehicle stopper according to an embodiment of the present invention.

FIG. 1b is a flowchart illustrating a decision tree of the vehicle stopper 100 according to an embodiment of the present invention.

Referring to the FIG. 1b, (S100) a signal is received by the vehicle stopper 100. (S102) The received signal is processed to determine whether or not it originates from a vehicle. If the signal is determined to be a vehicle signal, (S104) the signal is further processed to identify the engine controller of the vehicle, and (S106) to find available techniques from a database to interrupt the identified engine controller. (S108) Based on the results of steps S104 and S106, (S108) a best technique is selected to interrupt the engine controller. (S110) The selected best technique is applied, and (S112) signal is received and collected from the vehicle to determine the effectiveness of the technique. (S114) If the technique is effective, (S116) the interruption signal power level is reduced to sustainment power level, otherwise, (S118) an alternative technique is selected.

With the above-described closed-feedback loop, alternate signals can be identified to interfere with the engine operations of the target vehicle 106 in cases where originally selected highest probability signals are ineffective on the target vehicle 106 (e.g., due to countermeasures or excessive shielding, etc.) In other embodiments, other suitable alternative approach (e.g., acoustic) of sensing engine timing may be required for highly shielded targets. With the above-described embodiments, the synchronized radio frequency signal 115 can be transmitted at power levels that are safe for humans and generally non-destructive to the vehicles while still providing an effective way to disrupt or disable the engine of the target vehicle 106. Reduction of power is accomplished by narrow frequency ranges and narrow pulse widths of the synchronized radio frequency signal 115. This reduced power allows extended range of operation and significantly reduces any health risks to humans in the field of application.

Besides having the ability of permanently disabling the target vehicle 106, the vehicle stopper 100 may provide soft failure modes to temporarily stop or disable the target vehicle 106. In soft failure modes, upon the removal of the synchronized radio frequency signal 115, the operation of the target vehicle 106 can be resumed. Other considerations in selecting the proper synchronized radio frequency signal 115 include identifying modulation on signal/pulse train characteristics that interfere with the engine without risk to any people (e.g., signals that would be pacemaker-safe), selecting particular target vehicle in noisy RF environment, synchronizing with target vehicle at extended range (e.g., 100's of meters), automatically selecting target vehicle based on operator selection, and providing option to allow drive-away or not (i.e. hard failure).

Experimental Result

Figure 2:
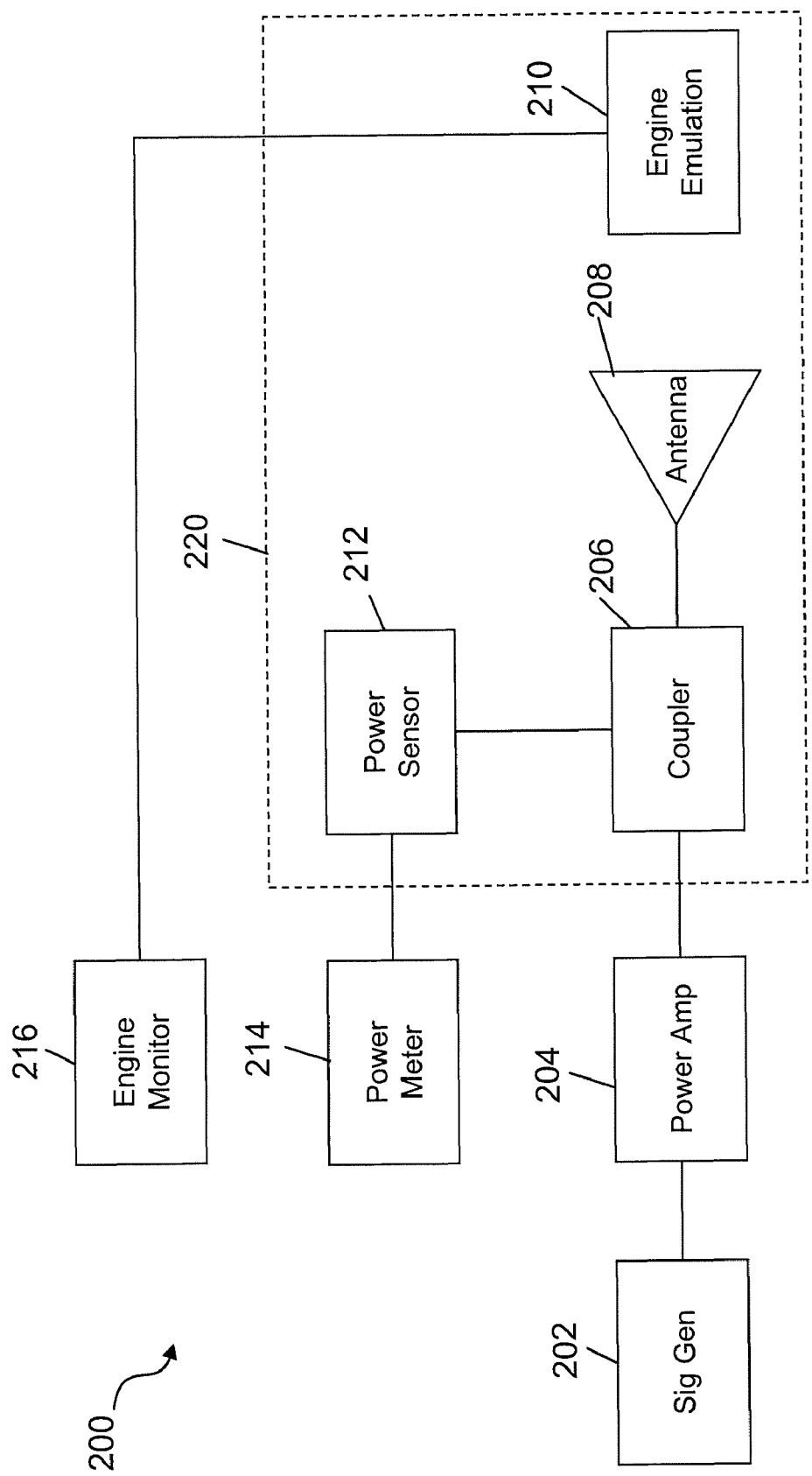
FIG. 2 is a block diagram of a test setup according to an embodiment of the present invention.
Figure 3:
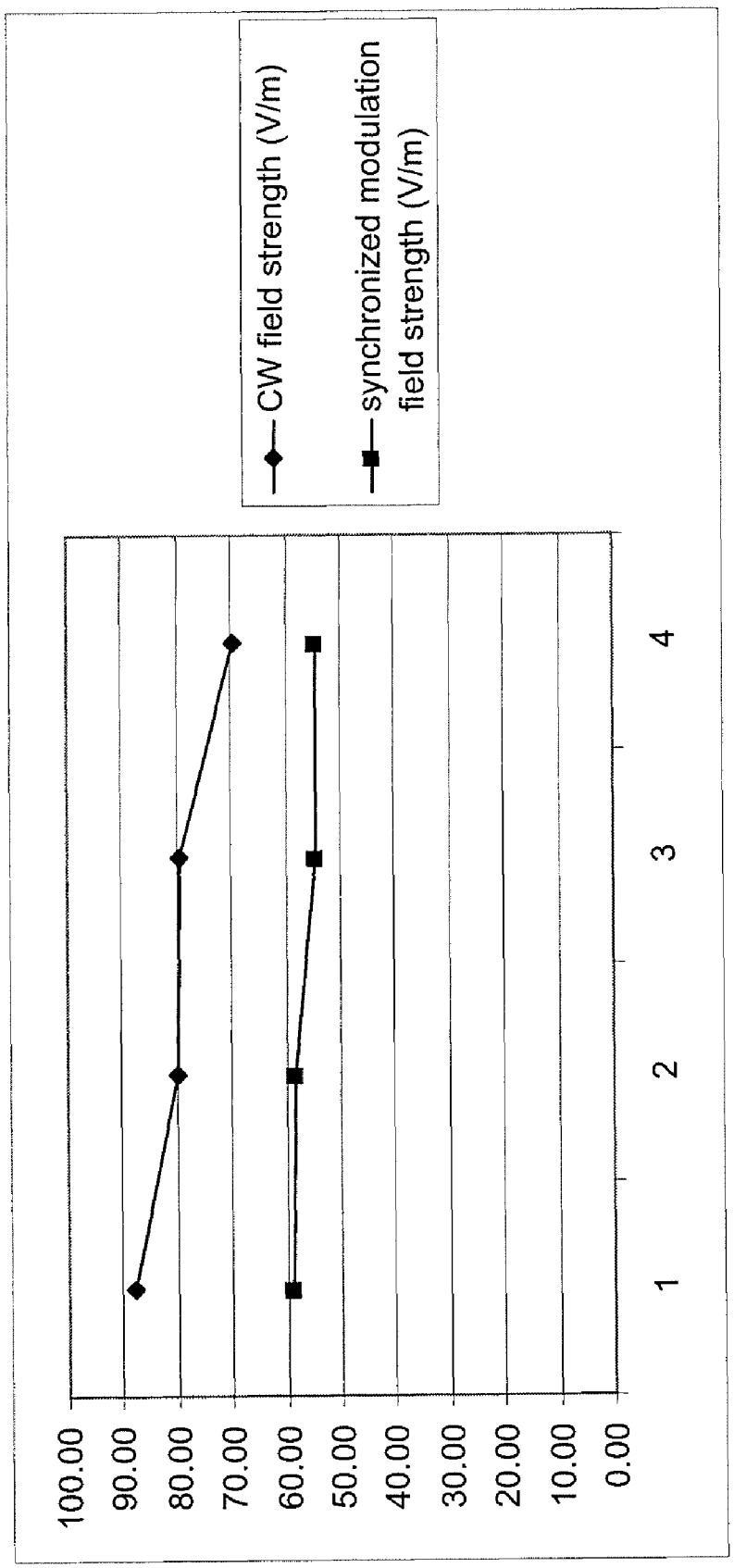
FIG. 3 is a graph illustrating experimental results of the test setup of FIG. 2.

FIG. 2 is a block diagram of a test setup according to an embodiment of the present invention. FIG. 3 is a graph illustrating experimental results of the test setup of FIG. 2.

Referring to FIG. 2, a test setup 200 was provided in EMI lab or anechoic chamber to study the effectiveness of interference signals to show power requirements of the vehicle stopper 100. The test setup 200 includes a signal generator 202, a power amplifier 204 connected to an output of the signal generator 202, a coupler 206 for coupling an antenna 208 to the power amplifier 208. The antenna 208 radiates an interruption signal to an engine emulation unit 210. In addition, a power sensor is connected to the coupler 206 for sensing the power of the transmitted interruption signal. The sensed power level is displayed on a power meter 214 connected to the coupler 206. Further, an engine monitor 216 is provided to monitor the operation of the engine emulation unit 210 to determine the effectiveness of the interruption signal. The power sensor 212, the coupler 206, the antenna 208 and the engine emulation unit 210 are located in an anechoic chamber 220. With the above-described test setup, test results showed that the electronic control unit (ECU) of the engine emulation unit 210 was interrupted with a CW signal at 79 V/m at 1 meter. Simple modulation effects of square wave pulses at 102 Hz on same carrier signal lowers electric field strength requirement to 55 V/m at 1 meter. The results showed that eleven of twelve interruptions were cleared/reset automatically when the interrupting signal was removed, and one of twelve interruptions required that the ECU be completely repowered before it resumed normal operations. The experiments showed that results were repeatable at low power level from different ECU orientations and levels of shielding.

Figure 4:
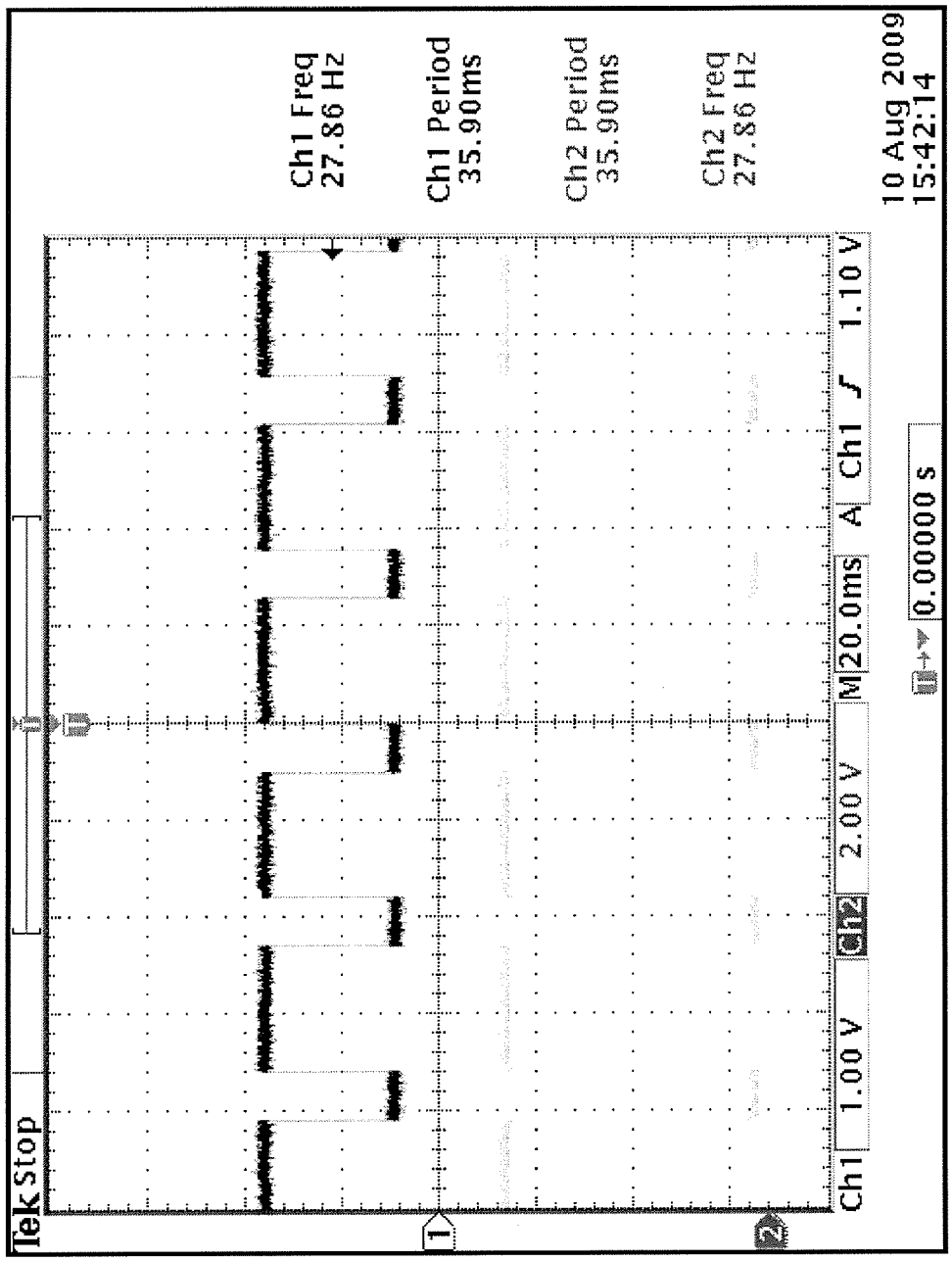
FIG. 4 is a graph illustrating an exemplary signal received from an engine emulation unit and an interruption signal that is used to interfere with a controller of the engine emulation unit.

FIG. 4 illustrates an exemplary signal received from the engine emulation unit 210 and an interruption signal that is used to interfere with the ECU.

Exemplary Applications

The embodiments of the present invention have many applications. In an exemplary application, a car-jacking or drunken driver refuses to stop for police. A vehicle stopper as described-above either mounted on the patrol car or in a helicopter identifies the target vehicle, synchronizes with its engine timing, and at the operator's discretion, the vehicle is stopped abruptly or gradually by an RF signal radiating from the transmit antenna of the vehicle stopper. The gradual approach might be useful as a way of posing the least danger to any people in the vehicle and of not destroying the motor or engine. In emergencies, for example, the vehicle was about to collide with a crowd of bystanders, the immediate stop mode would be a better choice. Other situations where the vehicle stopper is applicable include roadblock, sobriety checkpoint, border protection, pursuit of fleeing vehicle, etc. However, the present invention is not limited to the above applications.

The foregoing description has provided exemplary and non-limiting examples a full and informative description of the exemplary embodiments of this invention. However, various modifications and adaptations may become apparent to those skilled in the relevant art in view of the foregoing description, when read in conjunction with the accompanying drawings and the appended claims and their equivalents. However, all such and similar modifications of the teachings of this invention will still fall within the scope of this invention.

Furthermore, some of the features of the exemplary embodiments of the present invention could be used to advantage without the corresponding use of other features. As such, the foregoing description should be considered as merely illustrative of the principles of the invention, and not in limitation thereof.

What is claimed is:

1. A system for disrupting an internal combustion engine, the system comprising:
   a receiver for wirelessly receiving an emitted signal from the internal combustion engine, the emitted signal corresponding to an operational parameter of the internal combustion engine;
   a signal generator for generating an interruption signal in accordance with the emitted signal; and
   a transmitter for transmitting the interruption signal to disrupt an operation of the internal combustion engine.

2. The system in accordance with claim 1, wherein the signal generator comprises:
   a database for storing engine information of a plurality of different engine types and/or fuel systems.

3. The system in accordance with claim 1, wherein the signal generator comprises:
   a techniques generator for generating various RF techniques to disrupt the operation of the internal combustion engine.

4. The system in accordance with claim 1, wherein the signal generator comprises a signal processor.

5. The system in accordance with claim 1, wherein the interruption signal is modulated in accordance with the emitted signal.

6. The system in accordance with claim 1, wherein the emitted signal corresponds to an engine timing of the internal combustion engine.

7. The system in accordance with claim 1, wherein the receiver, the transmitter and the signal generator form a closed-loop feedback system.

8. The system in accordance with claim 7, wherein the receiver provides a feedback to the signal generator on the effectiveness of the interruption signal in disrupting the operation of the internal combustion engine.

9. The system in accordance with claim 8, wherein the signal generator adjusts the interruption signal in accordance with the feedback to improve the effectiveness of the interruption signal on disrupting the operation of the internal combustion engine.

10. The system in accordance with claim 1, wherein the interruption signal comprises a complex modulation.

11. The system in accordance with claim 10, wherein the complex modulation comprises square wave and pulse modulation types.

* * * * *